United States Patent [19]
Grzebielski

[11] 3,996,504
[45] Dec. 7, 1976

[54] REGENERATIVE MOTOR CONTROL HAVING FIELD AND ARMATURE COORDINATING MEANS

[75] Inventor: Chester Joseph Grzebielski, Grafton, Wis.

[73] Assignee: Allen-Bradley Company, Milwaukee, Wis.

[22] Filed: Apr. 24, 1975

[21] Appl. No.: 571,209

[52] U.S. Cl. .............................. 318/258; 318/376
[51] Int. Cl.² .......................................... H02P 3/14
[58] Field of Search .......... 318/258, 261, 269, 375, 318/376, 379, 381, 493

[56] References Cited
UNITED STATES PATENTS

| | | | |
|---|---|---|---|
| 3,458,790 | 7/1969 | Wilkerson | 318/258 |
| 3,486,102 | 12/1969 | Wilkerson | 318/376 X |
| 3,564,365 | 2/1971 | Zelina | 318/258 X |
| 3,878,447 | 4/1975 | MacDonald | 318/375 |

Primary Examiner—Robert K. Schaefer
Assistant Examiner—W. E. Duncanson, Jr.
Attorney, Agent, or Firm—Andrus, Sceales, Starke & Sawall

[57] ABSTRACT

A regenerative motor control of the field reversing type includes an input amplifier, a field circuit for energizing the motor field, and an armature circuit for energizing the motor armature. An improved means for coordinating the operation of the field and armature circuit is operable in accordance with the magnitude and polarity of the field current for limiting the magnitude of the amplifier output signal and the armature current during portions of the transient period and under weak field conditions. During normal operation the armature circuit is not so restricted.

10 Claims, 2 Drawing Figures

REGENERATIVE MOTOR CONTROL HAVING FIELD AND ARMATURE COORDINATING MEANS

BACKGROUND OF THE INVENTION

1. Field of the Invention

The present invention relates to a regenerative direct current motor control which provides regenerative braking by reversing the motor field. More specifically, the present invention is directed to such a control having an improved means for coordinating the operation of the field and armature circuits of the control.

2. Description of the Prior Art

In regenerative direct current motor controls, the braking of the motor necessary for precise speed regulation or other desired operating characteristics is obtained by applying the power generated in the motor during braking back to the active power source for the motor, such as a.c. supply lines.

Regenerative braking is advantageous in that, with proper control of armature current, braking may be done on a permanent basis, whereas resistive braking or other methods, such as plugging, are normally utilizable only in transient conditions or for isolated stops. Braking may also be accomplished very rapidly by regeneration.

Power may be regenerated or returned to the active motor power source by maintaining the same polarity of motor armature voltage while reversing the direction of armature current flow, as in "armature reversing" regenerative motor controls. Motor power may also be regenerated by maintaining motor armature current flow in the same direction while reversing the polarity of the armature voltage. Armature voltage reversal is obtained by reversing the motor field. A motor control employing this technique is termed a "field reversing" regenerative control and is the type to which the present invention is directed. A field reversing control includes a field circuit for controlling and reversing the motor field current and an armature circuit for controlling the motor armature current.

In regenerative braking operation, the reversal of the motor field responsive to a reversal of the motor operative condition error signal reverses the polarity of the motor flux. This reverses the armature counter e.m.f. assuming the direction of motor rotation remains instantaneously the same. The reversed counter e.m.f. biases the thyristors in a thyristor bridge between the a.c. supply lines and the motor armature for current conduction in the same direction as during motoring any time the counter e.m.f. is more negative than the a.c. supply line voltage. This will include a portion of the negative half cycles of the alternating current power, thus permitting the reversal of voltage necessary for regeneration.

A problem in the design and operation of field reversing regenerative motor controls in the past has been coordinating the operation of the field circuit and the armature circuit. The electro-mechanical construction of the motor field winding is such that the inductance, and time constant, of the motor field winding is substantially greater than that of the armature winding. Hence, changes in the magnitude of the armature current can be made more rapidly than changes in the magnitude of the field current. In a typical direct current motor, the ratio of the rapidity of changes in the armature current to changes in the field current may be on the order of 10:1; that is, changes in the armature current may be affected ten times more rapidly than changes in the field current.

During normal operation, it is desirable to allow the armature circuit and the field circuit to operate independently, responsive to changes in the error signal, thereby to take advantage of the rapidity by which changes can be made to the armature current in restoring the operative condition of the motor to desired levels.

However, during the field reversal necessary for regenerative operation, it is imperative to coordinate the operation of the armature circuit with that of the field circuit. The reversal of the motor field winding current occurs during a transient period, the duration of which is established by the motor field winding time constant. In this time interval, the motor field weakens in one direction of current flow, reverses, and increases in the other current flow direction.

During the transient period it is desirable to have small or zero armature current to prevent speed increases as the field weakens and commutator sparking due to armature reaction.

Several techniques for achieving the desired coordination between the field and armature circuit of regenerative motor controls appear in the prior art. For example, U.S. Pat. No. 3,435,316, assigned to the same assignee, discloses the use of logic type switch means operable between a pair of discrete states by the polarity of the motor operative condition error signal and the direction of field winding current flow to remove the input signal to the armature circuit at least during the initial portion of the transient period.

In a typical regenerative motor control, a high gain amplifier is employed at the input of the control so as to permit small reversals of the error signal to initiate regenerative operation and provide close regulation of the operative condition of the motor.

In regenerative motor controls having a switching type of logic, large magnitude signals from the input amplifier may be abruptly applied to the armature circuit, once field reversal has been accomplished. This may drive the armature current immediately to maximum value causing weak field commutator sparking, undesirable suddenness in the commencement of the regenerative braking action, and instability in the operation of the control.

Another way to accomplish the desired coordination between the field and armature circuits of a regenerative motor control is to establish the magnitude of the armature current in accordance with the magnitude of the field current so that as the field current goes to zero during reversal, the armature current is similarly taken to zero. Such a technique also prevents the sudden reapplication of armature current since as the field winding current slowly increases after field reversal, in accordance with the inductive characteristics of the field winding, the magnitude of the armature current will similarly increase. U.S. Pat. No. 3,458,790, also assigned to the same assignee, shows such a control in which the armature current is established by, or "follows" the field current.

However, such a technique may result in an undesirable reduction in the response time of the motor control due to the fact that changes in the magnitude of the armature current are now limited to the much longer time constant of the motor field winding outside the transient period as well as during the transient period.

SUMMARY OF THE PRESENT INVENTION

It is, therefore, the object of the present invention to provide a regenerative direct current motor control having improved field circuit-armature circuit coordinating means which removes armature current during field reversal. More particularly, the improved coordinating means provides both a controlled reestablishment of armature current under transient conditions and fast response characteristics to the control under ordinary operating conditions.

The gist of the present invention is to control the output of the input amplifier of the motor control responsive to the magnitude and polarity of the field winding current so as to prevent armature current in the motor without the presence of field winding current in the correct flow direction and so as to establish the build up of the armature current in accordance with the build up of field current. Since the field winding current varies slowly, the initial controlled output signal provided by the input amplifier varies slowly, preventing sudden application of armature current. Beyond weak field conditions, the field circuit and the much faster armature circuit are free to operate independently, thereby providing rapid response characteristics to the control.

The limiting action is provided by limit circuitry coupled to the input amplifier. The limit circuitry is also coupled to the field winding and controlled by the magnitude and direction of field winding current. The limit circuitry retains the output of the input amplifier at a level sufficient to establish armature current until the field current has been established. Thereafter, the ouput of the amplifier may increase within the limit established by the existing field winding current.

DESCRIPTION OF THE PREFERRED EMBODIMENT

General

Figure 1:
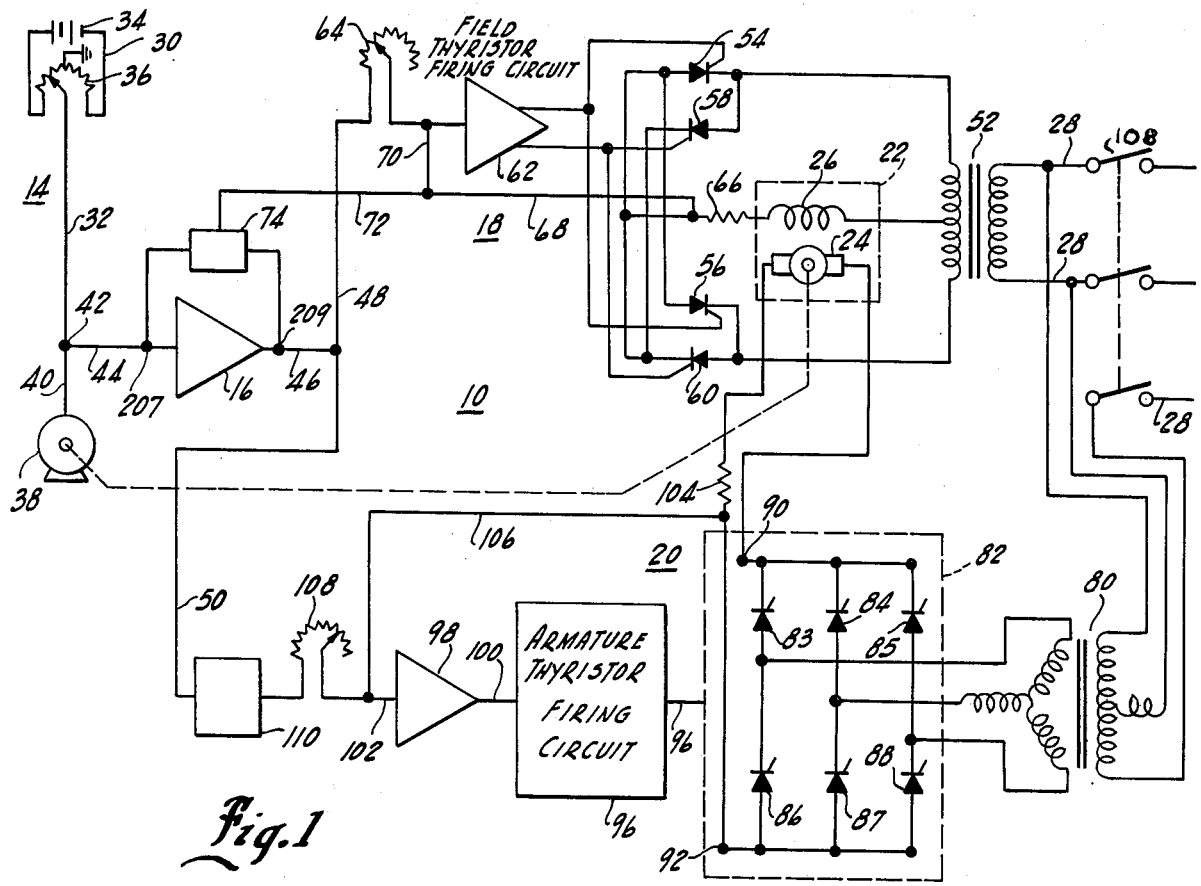
FIG. 1 is a schematic diagram of a field reversing regenerative direct current motor control of the present invention.

Referring now to FIG. 1, there is shown therein regenerative direct current motor control 10 constructed in accordance with the present invention. Control 10 utilizes reference and feedback circuit 14 and includes input amplifier 16, field circuit 18, and armature circuit 20. The control drives direct current motor 22 having an armature 24 and a field 26, each of which includes or comprises an electromagnetic winding. The control is provided with input power from a.c. lines 28.

Reference and Feedback Circuit

Reference and feedback circuit 14 includes a reference signal source 30 providing a variable d.c. signal to conductor 32 by means of d.c. supply 34 and potentiometer 36. A feedback signal may be provided by tachgenerator 38 which is connected to armature 24 and supplies a d.c. signal corresponding to the speed of armature 24 to conductor 40. Feedback signals corresponding to other operative conditions in the motor, such as torque, or operational conditions in the apparatus driven by the direct current motor, as for example, web tension, may be used. Hence, the control of the present invention is not to be construed solely as a motor speed control. Conductors 32 and 40 are joined at mixing junction 42 which provides an error signal to conductor 44. This error signal may be of either polarity and serves as a motoring control signal in one polarity and as a regenerative braking control signal in the other polarity.

Input Amplifier

The bipolarity error signal in conductor 44 is applied to input amplifier 16. Amplifier 16 is typically of the high gain, polarity inverting type commonly termed an "operational" amplifier. Amplifier 16 provides a bipolarity output signal in conductor 46. In accordance with the present invention, limiting circuit 74 is coupled to amplifier 16 to limit the magnitude of the output signal of the amplifier as described in detail below. Unless altered by the operation of limit circuit 74, amplifier 16 provides an output signal having a magnitude proportional to the input signal up to an abrupt saturation point. A typical circuit which may be employed as amplifier 16 is shown on page 119 of the Transistor manual, published by the General Electric Company, 7th edition, 1964.

The output signal of amplifier 16 in conductor 46 is provided to field circuit 18 in conductor 48 and to armature circuit 20 in conductor 50.

Field Circuit

Field circuit 18 is supplied with input alternating current from a.c. supply lines 28 through transformer 52. The center tap of the secondary winding of transformer 52 is connected to one end of motor field winding 26. The ends of the secondary winding of transformer 52 contain two groups of oppositely poled thyristors 54 and 56 and 58 and 60 connected to the other end of winding 26. These thyristors control the direction of current flow through motor field winding 26, one group of thyristors being energized for each direction of current flow. A field thyristor firing circuit 62, which may be deemed a push-pull amplifier, controls the operation of thyristors 54 through 60 in response to an input signal provided in conductor 48. The control provided by field thyristor firing circuit 62 determines which group of thyristors will be placed in the conductive state and the magnitude of field current. A typical circuit which may be employed as field thyristor firing circuit 62 is shown on page 59 of the SCR Manual published by the General Electric Company, 2nd edition, 1961 or in U.S. Pat. No. 3,484,676.

Conductor 48 from amplifier 16 to field circuit 18 includes potentiometer 64 which establishes the maximum field current magnitude.

Field circuit 18 also contains resistive means 66 connected in series with motor field winding 26. This resistive means acts as a means for sensing the polarity and magnitude of the current in motor field winding 26. Resistor 66 provides a feedback signal in conductors 68 and 70, corresponding to the magnitude of the current in the motor field winding, to the input of field thyristor firing circuit 62 for causing the magnitude of the motor current to be regulated by the signal in conductor 48 from amplifier 16. The field current signal from resistor 66 is also provided in conductor 72 as an input signal to limiting circuit 74 which limits the output amplifier 16.

Armature Circuit

Armature circuit 20 is supplied with power from a.c. supply lines 28 through transformer 80. The amount of power provided to motor armature 24 is controlled by armature thyristor bridge 82 interposed between transformer 80 and motor armature 24. Bridge 82 contains thyristors 83 through 88. Bridge terminals 90 and 92 constitute the output terminals of control 10 at which the voltage reversal necessary for regenerative operation takes place.

Armature thyristor firing circuit 94 controls the operation of the thyristors in armature thyristor bridge 82 by means of firing signals in conductor 96. In order for control 10 to provide regenerative operation, armature thyristor firing circuit 94 must be capable of controlling the operation of the thyristors through at least a portion of both the positive and negative half cycles of the alternating current from supply lines 28. Such a firing circuit may be provided by altering the phase relationship of the synchronizing voltages to the circuit shown on page 132 of the aforementioned SCR Manual to permit the circuit to operate for the portion of the other half cycle. A suitable firing circuit is also shown in U.S. Pat. Nos. 3,456,176 and 3,486,102.

A current regulating amplifier 98 provides an input signal to armature thyristor firing circuit 94 in conductor 100. Current regulating amplifier 98 regulates the armature current during motoring and regenerative operation and utilizes a signal provided in conductor 102 as a reference and the armature current feedback signal from a sensing means, such as resistor 104, in conductor 106 as a feedback signal. Potentiometer 108 in conductor 102 establishes the maximum armature current magnitude.

Absolute value circuit 110 has an input connected to conductor 50 and an output connected to conductor 102. Absolute value circuit 110 operates in the manner of a rectifier and provides a unipolarity signal in conductor 102 having the polarity necessary to operate current regulating amplifier 98 from the bipolarity signal in conductors 50 and 48.

Amplifier Limiting Circuit

Figure 2:
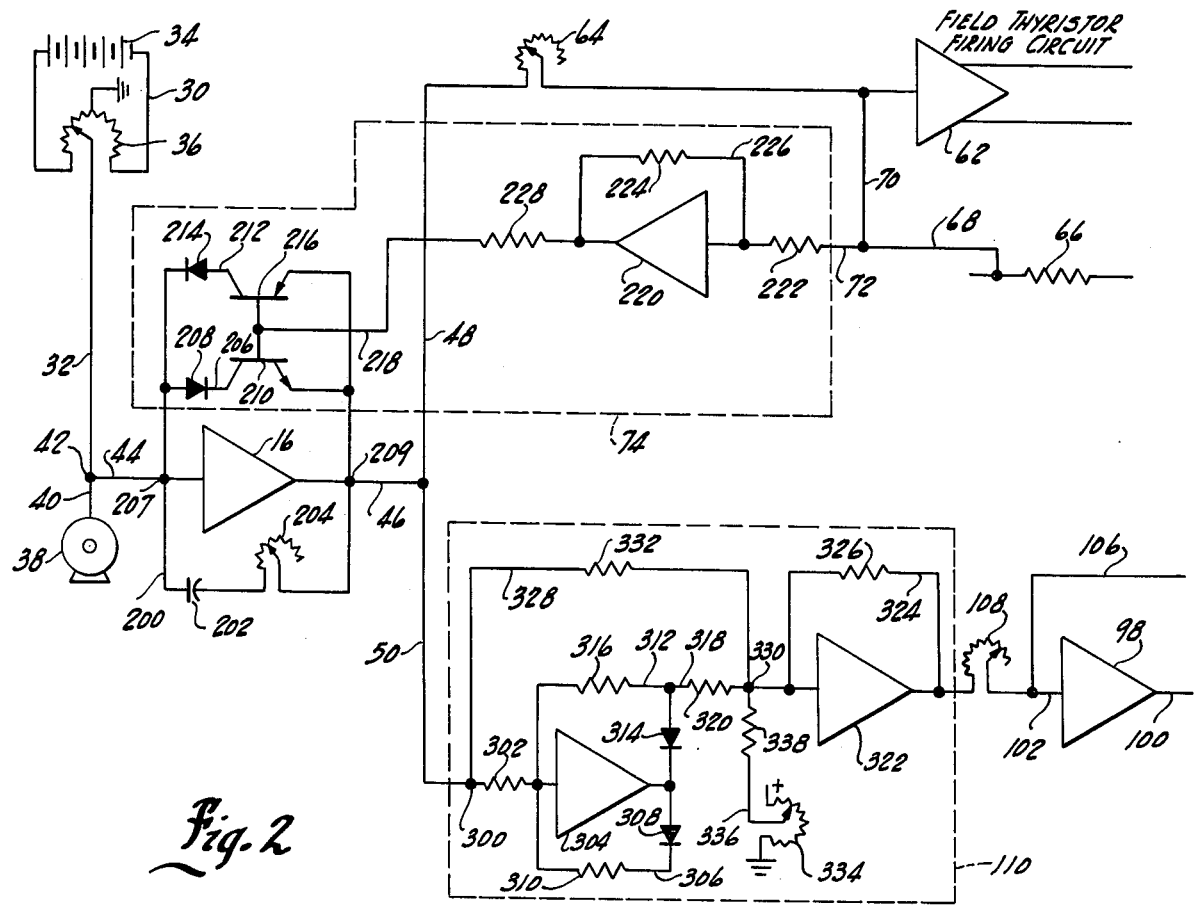
FIG. 2 is a detailed schematic showing, in greater detail, the portions of the control of FIG. 1 which obtain coordination between the field and armature circuits.

The limit circuit 74 for limiting the output of amplifier 16 is shown in greater detail in FIG. 2 in which similar elements bear the same identifying indicia as in FIG. 1.

Amplifier 16 includes a feedback conductor 200 connecting the output with the input. The conductor contains capacitor 202 and potentiometer 204 which provide a.c. stability and response to amplifier 16 and direct current motor control.

Limit circuit 74 includes a pair of current paths around amplifier 16. One such path conducts a signal of one polarity between the input and output of the amplifier while the other path conducts a signal of the other polarity. Conductor 206 extends from junction 207 connected in conductor 44 to junction 209 connected in conductor 46. Conductor 206 contains diode 208 and the emitter-collector path of NPN transistor 210. conductor 212 also extends from junction 207 to junction 209. Conductor 212 contains diode 214 and the emitter-collector path of PNP transistor 216. Diodes 208 and 214 prevent leakage currents from collector to base in transistors 210 and 216, respectively. The base elements of transistors 210 and 216 are connected to each other and to conductor 218.

As shown in FIG. 1, resistor 66 is connected in series with motor field 26 to provide a signal in conductor 68 which is indicative of the direction and magnitude of the current flow through motor field 26. This signal is also provided in conductor 72 to the input of limiting circuit 74.

The signal in conductor 72 is provided to the input of operational amplifier 220 through input resistor 222. The gain of operational amplifier 220 is controlled by the ratio of the resistance of input resistor 222 to resistor 224 in feedback path 226.

The output of operational amplifier 220 is provided through output resistor 228 in conductor 218 to the base terminals of transistor 210 and 216.

Absolute Value Circuit

The input to absolute value circuit 110 is established by conductor 50 at input terminal 300. The signal at terminal 300 is provided through input resistor 302 to operational amplifier 304. For a purpose hereinafter described, amplifier 304 has a gain of two. Conductor 306 connecting the output and input of amplifier 304 contains diode 308 and resistor 310. Conductor 312 also connecting the output and input of amplifier 304 contains diode 314 and resistor 316.

Conductor 318 is connected to conductor 312 intermediate diode 314 and resistor 316. Conductor 318 is connected through resistor 320 to the input of amplifier 322. Conductor 324 connecting the output and input of amplifier 322 contains resistor 326. The output of amplifier 322 is provided in conductor 102 and through potentiometer 106 to the input of current regulating amplifier 98.

Conductor 328 is connected between input terminal 300 and junction 330 located in conductor 318 at the input of amplifier 322. Conductor 328 contains resistor 332.

A bias source includes potentiometer 334, the resistance element of which is connected between a source of positive voltage and ground. The wiper of potentiometer 334 is connected to conductor 336 and through resistor 338 to junction 330.

Operation

To operate motor 22, switch 108 in a.c. supply lines 28 is closed to energize control 10. Reference signal source 30 is adjusted to provide a signal having a magnitude corresponding to the desired speed of motor 22 and a polarity corresponding to the desired direction of rotation. It may be assumed for exemplary purposes that the reference signal has a positive polarity. The reference signal is supplied through conductor 32 to junction 42 and thence to conductor 44 and junction 207. As armature 24 is not yet rotating, no feedback signal will be supplied by tach-generator 38.

In the absence of limiting circuit 74 the signal at junction 207 would typically drive high gain amplifier 16 into saturation providing a large output signal which would abruptly energize, particularly, armature circuit 20, as described above. However, with limiting circuit 74, the output signal of operational amplifier 16 is limited or clamped to a small magnitude signal corresponding to the base-emitter voltage drop of transistor 210. This clamping action occurs in the following manner. The voltage at the base terminal of transistor 210 is zero since the field winding is not energized. A voltage applied to the emitter of transistor 210 greater than the base-emitter voltage drop of the transistor will render the transistor conductive. This voltage is typically −0.6 volts.

Thus, when a positive polarity input signal is applied to junction 207 in the input of amplifier 16, amplifier 16 attempts to provide a large magnitude negative polarity output signal at the output of the amplifier due to its gain. However, as soon as the voltage at junction 209 attempts to increase above the base-emitter voltage drop of transistor 210, i.e. above −0.6 volts, transistor 210 is rendered conductive and permits current to flow through diode 208 and transistor 210, reducing the signal from junction 207 provided to amplifier 16 and the output of amplifier 16. In this manner, the output of amplifier 16 and the signal in conductor 46 is clamped to −0.6 volts.

The signal in conductor 46 is provided in conductor 50 to input terminal 300 of absolute value circuit 110 in armature circuit 120. This negative signal is applied through resistor 302 to amplifier 304 to provide a positive output signal at the output of this amplifier. This positive output signal is blocked by diode 314 so that amplifier 304 and the associated circuitry have no present effect on the operation of absolute value circuit 110.

The negative input signal at input terminal 300 passes through conductor 328 to the input of amplifier 322. However, potentiometer 334 is adjusted to provide a positive signal at junction 300 which cancels out the negative signal in conductor 328 so that no input signal is provided to amplifier 322. No output signal is provided from absolute value circuit 110 in conductor 102 to the remainder of the armature circuit and armature thyristor bridge 82 and armature 24 are not energized.

The −0.6 volt signal in conductor 46 is also provided in conductor 48 to the input of field thyristor firing circuit 62. Field thyristor firing circuit 62 utilizes the negative polarity of the output signal in conductor 46 and 48 to turn on thyristors 58 and 60 to commence the flow of field current through motor field winding 26. The gain of field thyristor firing circuit 62 may be such as to fire thyristors 58 and 60 fully on responsive to the −0.6 volts input signal to the firing circuit.

The flow of field current through motor field winding 26 also provides a current flow through sensing resistor 66. The commencement of this current flow initiates a positive voltage signal, proportional in magnitude to the magnitude of the field winding current flow, in conductor 68 and 70. This signal serves to regulate magnitude of the field current in accordance with the signal in conductor 48.

The initiation of the field winding current feedback signal in conductor 68 also provides a signal in conductor 72 to the input of limiting circuit 74. More specifically, the signal is provided to the input of amplifier 220. Amplifier 220 begins to provide a negative output signal in conductor 218 to the common base connection of transistors 210 and 216.

As a negative voltage begins to be established on the base of transistor 210, the emitter voltage which renders the transistor conductive correspondingly increases. For example, with a base voltage of −1 volt, the emitter voltage necessary for conduction is −1.6 volts, that is, the base voltage of −1 volt plus the base-emitter voltage drop of −0.6 volts.

The output of amplifier 16 may thus assume any signal level up to a maximum of −1.6 volts before transistor 210 is rendered conductive to clamp the output of amplifier 16 to the −1.6 volt level.

Thus, as the current in field winding 26 increases, the magnitude of the output signal of amplifier 16 may similarly increase to any level up to a corresponding maximum level. In the event field thyristor firing circuit has not been driven into saturation by the initial −0.6 volt signal in conductor 48, the increased output signal of amplifier 16 serves to further advance the firing angles of thyristors 58 and 60 and increase the field winding current. When the magnitude of the field current reaches some predetermined level, the output signal magnitude range of amplifier 16 will have been expanded to include the maximum output of amplifier 16.

The increases of field current increase the signal in conductor 218 to the base of transistor 210. This increase continues until the signal in conductor 218 reaches a level equal to the output signal of amplifier 16 plus the base-emitter voltage drop of transistor 216. When the signal in conductor 218 attains this voltage, the base-emitter junction of transistor 216 is rendered conductive restricting the signal in conductor 218 to that level. Only the base-emitter junction is rendered conductive by this action. The entire transistor is not rendered conductive so that no current flows in conductor 212 or diode 214.

In the armature circuit, as the signal in conductor 46 increases beyond the initial −0.6 volt signal, the signal in conductor 50 to junction 300 of absolute value circuit 110 is correspondingly increased. The signal in conductor 328 to junction 338 increases beyond the bias provided by potentiometer 334 and provides an input signal to amplifier 322 and an output signal in conductor 102.

The output signal in conductor 102 is applied to current regulating amplifier 98 and to armature thyristor firing circuit 94 in conductor 100. Armature firing circuit 94 provides firing signals to the thyristors of armature thyristor bridge 82 in conductor 98 proportional to the output of absolute value circuit 110 to energize and accelerate armature 24.

The initial rate at which the armature current builds up is determined by the signal in conductor 50 which in turn is determined by the rate at which the field current is increasing due to the action of limiting circuit 74. However, once the field current has increased to the predetermined level the output signals of amplifier 16 encompass its full range and the action of limiting circuit 74 is effectively eliminated. The output signal of amplifier 16 in conductor 46 is thereafter determined solely by the input signal in conductor 44. Amplifier 16 provides rapid and increased alteration in the signal in conductor 46 responsive to changes in the error signal in conductor 44 established by reference signal source 30 and the feedback signal from tach-generator 38 produced by the rotation of armature 24. The fast response time of armature circuit 20 provides rapid regulation of the armature current responsive to the signals in conductor 46 by means of armature thyristor bridge 82 and the signals in conductors 50, 102, 106, and 96 so that motor 22 assumes the speed established by reference signal source 30.

Typically the gain of field thyristor firing circuit 62 is such as to drive the circuit into saturation by the initial −0.6 volt signal from amplifier 16 to provide full field current so that the magnitude of the field current is not thereafter changed by changes in the magnitude of the amplifier output signal in conductor 46. However, should changes in the motor field current occur, they will occur much more slowly than changes in the armature current due to the inductive time constant of the motor field.

Regenerative operation of control 10 may be brought on by reducing the reference signal in conductor 32 or by providing an overhauling load to armature 24. In either case, the feedback signal generated by tach-generator 38 in conductor 40 exceeds the reference signals generated by reference signal source 30 in conductor 32. This reverses the polarity of the error signal in conductor 44 from positive to negative.

The negative signal now provided to junction 207 provides a positive signal at the output of amplifier 16. This positive voltage biases transistor 210 off by reverse biasing the emitter-base junction. In transistor 216, the base-emitter junction has been conducting by virtue of the base-emitter biasing voltage provided in conductor 218. The existence of a positive voltage on emitter both continues this conduction and renders the emitter-collector circuit of the transistor conductive. This limits the magnitude of the voltage at the emitter terminal of transistor 216 to the forward voltage drop of the transistor, typically +0.6 volts.

The +0.6 voltage in conductor 46 is applied through conductor 50 to input terminal 300 of absolute value circuit 110. The signal at terminal 300 is applied to amplifier 304 which has a gain of 2 to provide a −1.2 volt signal at the output of amplifier 304. The −1.2 volt signal passes through diode 314 and conductor 318 to junction 330. The +0.6 volt signal at terminal 300 is also provided through conductor 328 to junction 330 and the +0.6 volt signal from potentiometer 334 is provided to junction 330. The two +0.6 volt signals cancel out the −1.2 volt signal from amplifier 304 so that no input signal is provided to amplifier 322. This removes the output signal in conductor 102 to the remaining portions of armature circuit 20 to reduce the armature current to zero.

The +0.6 volt signal in conductor 46 is also provided to field thyristor firing circuit 62. This positive polarity signal causes field thyristor firing circuit 62 to phase back thyristors 58 and 60 in field circuit 18 to commence decay of the motor field winding current. The decay occurs at a rate determined by the inductance of the motor field winding and the applied voltage established by field thyristor firing circuit 62. When the current has decayed to zero it is reestablished in the other flow direction by thyristors 54 and 56.

The feedback signal in conductors 68 and 72 to amplifier 218 also decreases. However, this has no effect on the operation of limit circuit 74 since the operation of diode 208 and transistor 210 in conductor 206 is blocked by the negative polarity of the voltage at junction 207 and the polarity of the output signal in conductor 218 is inappropriate to effect any alteration in the condition of transistor 216 in conductor 212.

When the field current falls to zero and reverses direction, the polarity of the field current feedback signal in conductors 68 and 72 to the input terminal of amplifier 218 also reverses. This causes a positive signal to appear at the output of amplifier 220 and in conductor 218.

As the magnitude of the field winding current starts to increase in the opposite direction of current flow, the magnitude of the signal in conductor 218 also increases. The maximum permissible voltage which may exist at the emitter of transistor 216 and at junction 209 rises in accordance with the base voltage and is equal in magnitude to the positive base voltage signal plus the base-emitter voltage drop of transistor 216. As before, as the field current increases, the output signal range permitted of amplifier 16 expands to include the maximum output of amplifier 16.

As the magnitude of the signal at junction 209 and in conductors 46 and 50 increases, the magnitude of the signal in conductor 328 applied to junction 330 also increases. The output of amplifier 304 to junction 330 also increases. However, inasmuch as amplifier 304 has a gain of two, the negative output of amplifier 304 to junction 330 has twice the effect of the positive signal in conductor 328 to junction 330. The result of this arithmetic combination of signals at junction 330 is a signal to amplifier 332 which is proportional to the signal in conductor 50 and of the positive polarity. The corresponding output signal of amplifier 322 in conductor 102 when applied to armature thyristor firing circuit 94 through current regulating amplifier 92 operates armature thyristor firing circuit 94 to fire the thyristors in bridge 82 in the portions of the negative half cycles of the a.c. supply in which the a.c. supply voltage is more positive than the reversed counter e.f.m. provided by the reversed motor field, thereby to cause motor 24 to regenerate power back to a.c. supply lines 28.

The regeneration of power back to a.c. supply lines 28 will brake the speed of motor 22. When sufficient braking has been applied to reduce the speed of motor 22 to the desired level, as indicated by the reference signal in conductor 32, the feedback signal in conductor 40 will approach, equal and again become less than the reference signal. This will prepare control 10 for motoring operation by reversing the polarity of the signal in conductor 44 back to the positive polarity. This will initiate another transient period in which the operation of motor control 10 is analogous to that described above.

The operation of motor control 10 for the other direction of rotation of motor 22 is also analogous to the above description.

Various modes of carrying out the invention are contemplated as being within the scope of the following claims particularly point out and distinctly claiming the subject matter which is regarded as the invention.

I claim:
1. A regenerative motor control for regulating the operative condition of a direct current motor from a power source between the motoring and regenerative states in accordance with a bi-polarity operative condition error signal produced by a motor operative condition error signal source, said control comprising:
   input amplifier means having an input couplable to the error signal source and an output providing a bi-polarity output signal;
   field circuit means having an input coupled to said input amplifier and an output connectable to the field winding of the motor, said field circuit means being responsive to said output signal for providing current energization in either direction through the motor field winding and for reversing the current energization from a first direction through zero to a second direction during a transient period initiated by a reversal of the polarity of the error signal;
   signal means connected to said field circuit means for providing a signal proportional in magnitude to the magnitude of the motor field winding current energization and having a polarity indicative of the direction of said energization;

limiting means having an input receiving the signal from said signal means and an output connected to said input amplifier for limiting the output signal of said amplifier in accordance with the magnitude and polarity of the signal from said signal means to restrict the magnitude of the output signal in the initial portion of the transient period and under weak field conditions;

an armature circuit means having an output connectable to the armature winding of the motor for energizing the armature winding responsive to the magnitude of the controlling signal of a preselected polarity applied to an input thereof, the energization of the armature winding providing motoring operation to the motor for one direction of field winding current energization and providing regenerative operation to the motor, for the motoring direction of motor rotation, for the other direction of field winding current energization; and circuitry having an output connected to said armature circuit means and an input connected to said input amplifier for providing a controlling signal of the preselected polarity to the armature circuit means from the bipolarity signal of the input amplifier.

2. The regenerative motor control according to claim 1 wherein said limit means extends between the input and output of said amplifier, said limit means being operable by said signal means for establishing a limited magnitude range for the output signals of said input amplifier.

3. The regenerative motor control according to claim 2 wherein said limit means includes signal path means containing means operable by said signal means for establishing the limited signal magnitude range in accordance with the magnitude and polarity of the signal from said signal means.

4. The regenerative motor control according to claim 3 wherein said limit means includes a pair of parallel signal paths each capable of transmitting error signals of one current flow direction, said paths, containing said means operable by said signal means.

5. The regenerative motor control according to claim 4 wherein each of said paths includes a controllable current conduction device having a power circuit in said signal path and a control circuit connected to said signal means.

6. The regenerative motor control according to claim 5 wherein said controllable current conduction means comprises transistors.

7. The regenerative motor control according to claim 5 wherein the power circuits of said controllable current conduction devices have current flow direction controlling properties, said devices being selected to provide opposite current flow directions in said parallel paths.

8. The regeneratve motor control according to claim 1 wherein said armature circuit includes bias means for offsetting a preselected magnitude of output signal of said amplifier to prevent the generation of a controlling signal responsive to said preselected magnitude signal.

9. The regenerative motor control according to claim 1 wherein said circuitry comprises absolute value circuitry having an output connected to said armature circuit means and an input connected to said input amplifier.

10. The regenerative motor control according to claim 9 wherein said circuitry comprises absolute value circuitry having an output connected to said armature circuit means and an input connected to said input amplifier and wherein said bias means is in said absolute value circuit.

* * * * *